(12) United States Patent
Boren

(10) Patent No.: US 10,448,630 B2
(45) Date of Patent: Oct. 22, 2019

(54) TREE STAND BLIND

(71) Applicant: William Charles Boren, Madison, MS (US)

(72) Inventor: William Charles Boren, Madison, MS (US)

(*) Notice: Subject to any disclaimer, the term of this patent is extended or adjusted under 35 U.S.C. 154(b) by 0 days.

(21) Appl. No.: 15/491,861

(22) Filed: Apr. 19, 2017

(65) Prior Publication Data

US 2017/0295774 A1   Oct. 19, 2017

Related U.S. Application Data

(60) Provisional application No. 62/324,845, filed on Apr. 19, 2016.

(51) Int. Cl.
| | | |
|---|---|---|
| *E04H 15/04* | (2006.01) |
| *A01M 31/02* | (2006.01) |
| *E04H 15/00* | (2006.01) |
| *E04H 15/58* | (2006.01) |
| *E04H 15/54* | (2006.01) |
| *E04H 15/64* | (2006.01) |
| *E04H 15/32* | (2006.01) |
| *E04H 15/48* | (2006.01) |

(52) U.S. Cl.
CPC ......... *A01M 31/025* (2013.01); *E04H 15/001* (2013.01); *E04H 15/04* (2013.01); *E04H 15/322* (2013.01); *E04H 15/48* (2013.01); *E04H 15/54* (2013.01); *E04H 15/58* (2013.01); *E04H 15/64* (2013.01)

(58) Field of Classification Search
CPC ......... E04H 15/54; E04H 15/02; E04H 15/18; E04H 15/64; E04H 15/04; E04H 15/32; E04H 15/48; E04H 15/001; E04H 15/322; A01M 31/02; A01M 31/025
USPC .............. 135/90, 95–97, 901, 907, 115, 119, 135/120.4; 182/187–188, 135
See application file for complete search history.

(56) References Cited

U.S. PATENT DOCUMENTS

| | | | | |
|---|---|---|---|---|
| 3,358,789 A | * | 12/1967 | Laun ..................... | A01M 31/02 108/152 |
| 3,485,320 A | * | 12/1969 | Jones ..................... | A01M 31/02 182/129 |
| 4,285,354 A | * | 8/1981 | Beavers .................. | E04H 15/30 135/120.3 |
| 5,398,779 A | * | 3/1995 | Meyer .................. | A01M 31/025 182/136 |

(Continued)

*Primary Examiner* — Winnie Yip
(74) *Attorney, Agent, or Firm* — Michael C. Williams; Bradley Arant Boult Cummings LLP

(57) ABSTRACT

A tree stand hunting blind is comprised of two sides connected by a lower center portion. The blind does not have a roof and does not have a complete front wall. This allows a user to stand up and shoot a firearm or bow in any direction, including directly under the blind or directly above the blind. The bottom platform of a tree stand and the bottom portion of the blind function as a "floor" that helps hide the user from game animals below the blind. The sides of the blind break up the user's silhouette and help hide the user and the tree stand from game animals that are not directly under the blind. Each side of the blind incorporates a window with a moveable shade mechanism that allows them to be fully or partially opened or closed as needed by the user.

24 Claims, 12 Drawing Sheets

(56) References Cited

U.S. PATENT DOCUMENTS

| | | | | |
|---|---|---|---|---|
| 5,630,439 | A * | 5/1997 | Hutto | E04H 15/001 |
| | | | | 135/90 |
| 5,669,403 | A * | 9/1997 | Belcher | A01M 31/025 |
| | | | | 135/120.4 |
| 5,787,914 | A * | 8/1998 | Greywall | A01M 31/02 |
| | | | | 135/100 |
| 5,937,969 | A * | 8/1999 | Woller | A01M 31/02 |
| | | | | 182/187 |
| 6,148,836 | A * | 11/2000 | Cananzey | E04H 15/001 |
| | | | | 135/87 |
| 6,243,979 | B1 * | 6/2001 | Seats | A01M 31/025 |
| | | | | 182/135 |
| 7,100,626 | B2 * | 9/2006 | Livacich | E04H 15/001 |
| | | | | 135/117 |
| 7,182,091 | B2 * | 2/2007 | Maddox | A01M 31/025 |
| | | | | 135/90 |
| 7,219,680 | B1 * | 5/2007 | Gresock | A01M 31/025 |
| | | | | 135/139 |
| 7,370,728 | B1 * | 5/2008 | Mann | A01M 31/02 |
| | | | | 182/187 |
| 7,559,334 | B2 * | 7/2009 | Cooper | A01M 31/025 |
| | | | | 135/90 |
| 7,735,503 | B2 * | 6/2010 | Jenkinson | A01M 31/025 |
| | | | | 135/135 |
| 9,648,866 | B2 * | 5/2017 | Blaha | A01M 31/025 |
| 2003/0024559 | A1 * | 2/2003 | Fields | A01M 31/025 |
| | | | | 135/90 |
| 2004/0216953 | A1 * | 11/2004 | Cheeks | A01M 31/025 |
| | | | | 182/116 |
| 2006/0249640 | A1 * | 11/2006 | Hanson | A01M 31/025 |
| | | | | 248/214 |

* cited by examiner

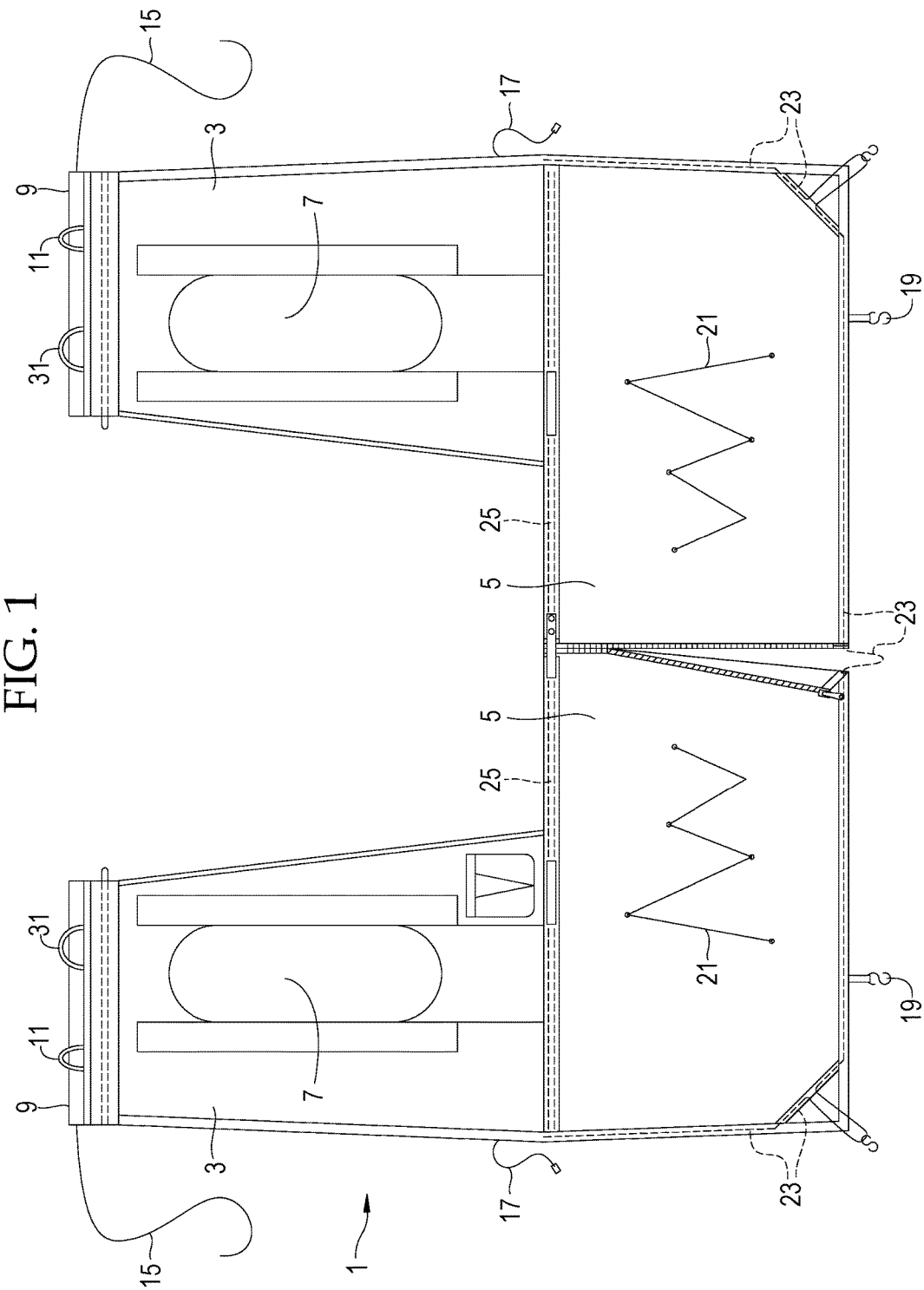

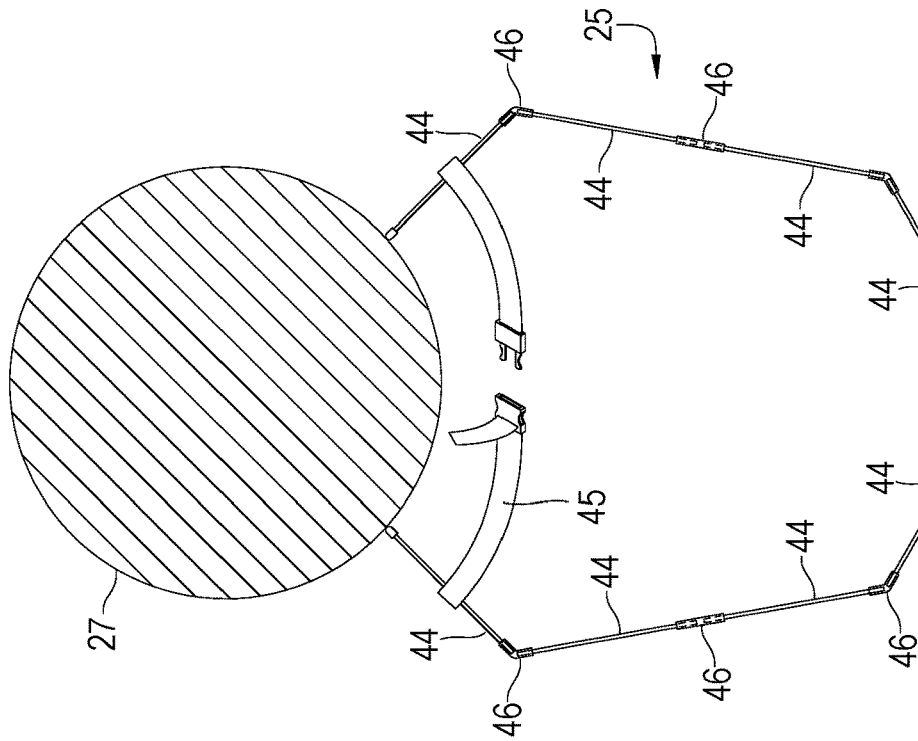
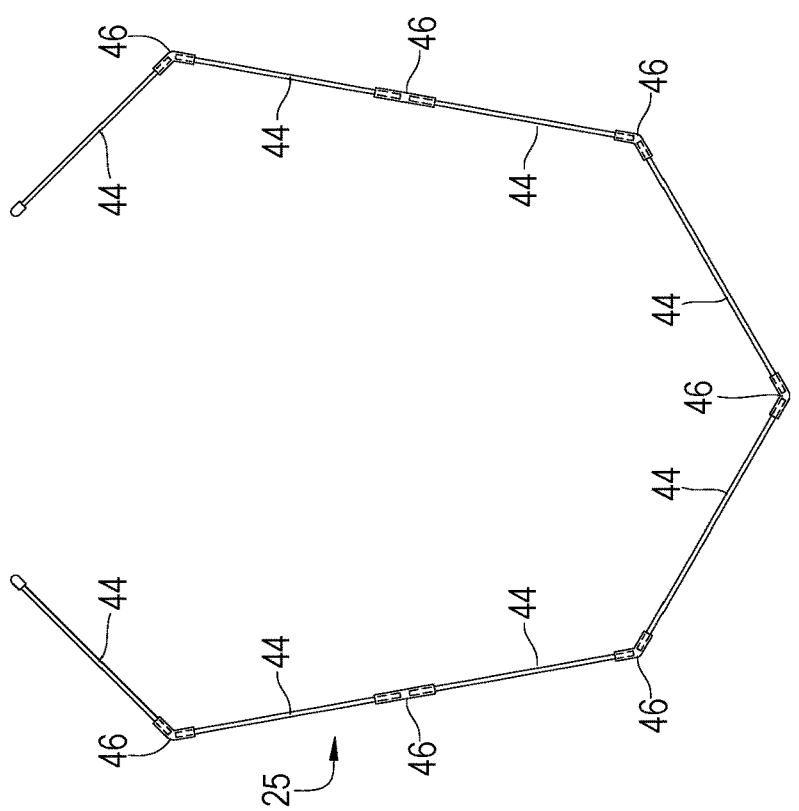
FIG. 6B
FIG. 6A

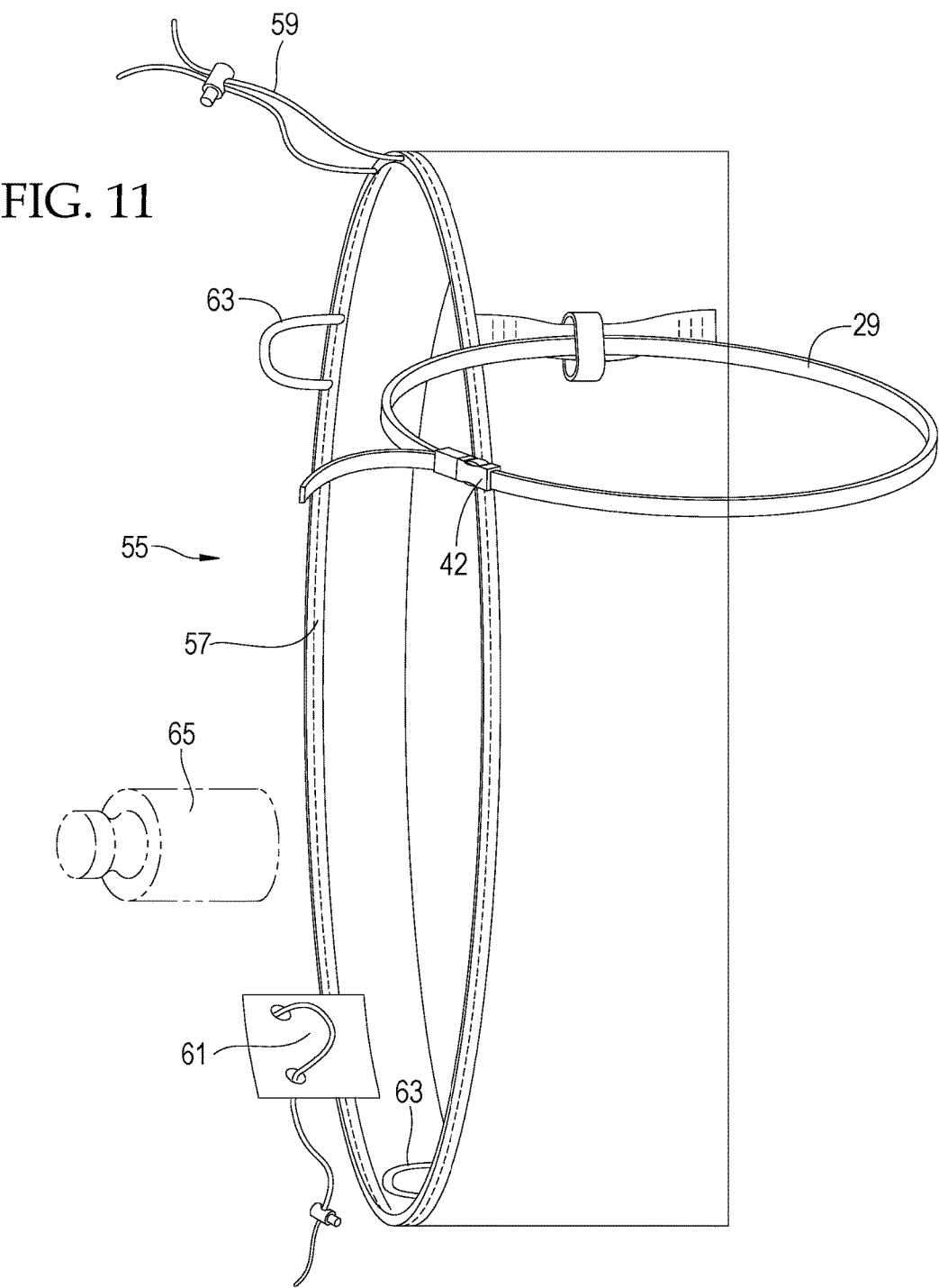

TREE STAND BLIND

PRIORITY

This application claims the Apr. 19, 2016 priority date of U.S. Provisional Patent Application Ser. No. 62/324,845. The entirety of that provisional application is incorporated herein by reference.

FIELD OF THE DISCLOSURE

The present invention relates to hunting blinds adapted for use with tree stands.

BACKGROUND OF THE INVENTION

Hunters commonly hunt from elevated tree stands. The tree stands help hunters to remain hidden from game and give the hunter a greater field of view. Ladder stands are one type of tree stands. Climbing stands and lock-on stands are other common types of tree stands.

However, tree stands do offer some disadvantages. The stands typically have no camouflage to break up the outline or silhouette of the stand and the hunter. A hunter in the stand is easily visible to game animals which are close to the stand and look up, and the hunter is in the line of sight of animals that are far from the stand. Game animals can easily detect movement, and a hunter in a tree stand must remain motionless for long periods of time.

One way hunters avoid detection is to climb higher in a tree, but this practice can be dangerous and can make it difficult to access the tree stand. Other options to stay undetected include forming some type of blind in the tree stand. Prior art blinds include loose burlap or other fabric wrapped around the tree stand. This method of concealment is disadvantageous because it can be tedious to install, limits a hunter's vision, and limits the hunter's ability to aim their firearm or bow at game animals. Other prior art blinds—such as the blind disclosed in U.S. Pat. No. 7,559,334—are better adapted to fit a tree stand but are still disadvantageous because they limit a user's ability to see out of the blind and still limit the user's ability to take aim at game animals that are on the move like game birds flying overhead.

Accordingly, there remains a need for a device to allow hunters to easily camouflage a tree stand while still retaining a wide field of vision and the ability to take aim at game animals in any direction.

SUMMARY OF THE INVENTION

The present invention overcomes many of the problems associated with prior art hunting blinds. The blind offers a user a wide field of vision and the ability to take aim in any direction. When used in conjunction with camouflage clothing, the tree stand blind and user blend together, allowing the user to "become one with the blind." The tree stand blind is easily set up when a hunter enters a tree stand and can be easily removed when the hunt is over, and it can be used with many types of tree stands or as a ground blind.

The tree stand blind is comprised of two sides connected by a lower center portion. The blind may be made of any suitable fabric which may include a camouflage pattern to hide the user. The blind does not have a roof and does not have a complete front wall. Each side of the blind incorporates a window with a moveable shade mechanism that allows them to be fully or partially opened or closed as needed by the user. The top of each of the sides incorporates a rigid support section that may be formed by a sleeved fiberglass rod or other suitable material.

One or more support loops are attached to the tops of each side. The support loops may be hung on hooks to suspend the blind from a tree. The hooks may be affixed to a tree strap that is fastened around a tree. A tie-down strap is affixed to the outer end of each of the tops of the sides. One or more hooks are attached to the bottom edge of the blind and are adapted to engage the bottom platform of a tree stand when the blind is in use.

The sides of the blind incorporate one more drawstrings that may be arranged in a spiral or zig-zag configuration. A user may tighten the fabric of the bling by tightening the drawstrings. This makes the blind fabric tight and prevents it from flapping in the wind. An additional drawstring may be incorporated into the bottom edge of the blind to tighten the blind around the platform of a tree stand.

A rigid horizontal support is incorporated into the fabric at the upper edge of the lower portion of the blind. The support extends across the top of the lower portion and through the sides and is terminated at the outer edges of the sides. The rigid support may be comprised of separate hollow sections connected by an elastic cord like a tent pole, but other appropriate materials and configurations may be used. When the sections of the support are assembled, the support provides shape to the blind and functions as a frame. The support is placed at the level of the user's knees.

To assemble the tree stand blind, a tree strap is affixed to the tree above the blind. The tree strap may be a strap with an attachment mechanism (such as a buckle) that incorporates loops or hooks for hanging the blind. Once the tree strap is attached to the tree, the blind's support loops are hooked over the tree strap hooks. Next, the hooks at the bottom of the blind engage the bottom platform of the tree stand and the sections of the rigid support are assembled. Then, the user pulls down on the tie-down straps, wraps the tie-down straps around the tree, and fastens the tie-down straps to one another. Alternatively, the tie straps may be fastened and tightened using a rope tightener. Pulling down and fastening the tie-down straps makes the support straps pivot in the hooks, thereby raising the front of the blind and tightening the fabric of the blind. This upward pulling motion causes the bottom hooks to tightly engage the tree stand platform and anchors the blind in place.

When the blind is anchored in place, the rigid support holds the fabric of the bottom portion of the blind away from a user's knees. If needed, a user may then tighten the drawstrings to make the blind more rigid and to prevent it from flapping in the wind.

When assembled in this manner, the blind has no roof and has no upper front wall. This allows a user to stand up and shoot a firearm or bow in any direction, including directly under the blind or directly above the blind. The bottom platform of a tree stand and the bottom portion of the blind function as a "floor" that helps hide the user from game animals below the blind. The sides of the blind break up the user's silhouette and help hide the user and the tree stand from game animals that are not directly under the blind. An optional canopy may be fitted to the blind to protect the user from rain. The user may wear a camouflage bib and facemask that match the camouflage pattern of the blind—by doing so, the user effectively "becomes the blind" and the user's clothing functions as the upper front wall of the blind.

One embodiment of the blind may be adapted for use with a ladder type tree stand. To facilitate entry into the blind, the lower center portion may incorporate a closeable opening that may be opened when a user climbs into the stand. The opening may be secured with hook and loop fasteners, a zipper, snaps, or other suitable closure method. Alternatively, the drawstring at the bottom of the blind may be loosened to allow a user to enter the blind.

The tree stand blind may also be used as a ground blind. To accomplish this, the user simply mounts the tree strap close enough to the ground to allow the bottom of the blind to hang close to the ground. Stakes, spikes, or other suitable staking means may be driven through the hooks on the bottom edge of the blind or otherwise attached to the blind to hold the blind in place. Fabric clamps and additional drawstrings may be used to facilitate use as a ground blind.

BRIEF DESCRIPTION OF THE SEVERAL VIEWS OF THE DRAWINGS

FIG. 1 is a view of the tree stand blind spread out on a flat surface.

FIG. 6a is an overhead view of a rigid support.

FIG. 6b is an overhead view of a rigid support.

FIG. 11 is a perspective view a blind carrying case.

DETAILED DESCRIPTION

Figure 2A:
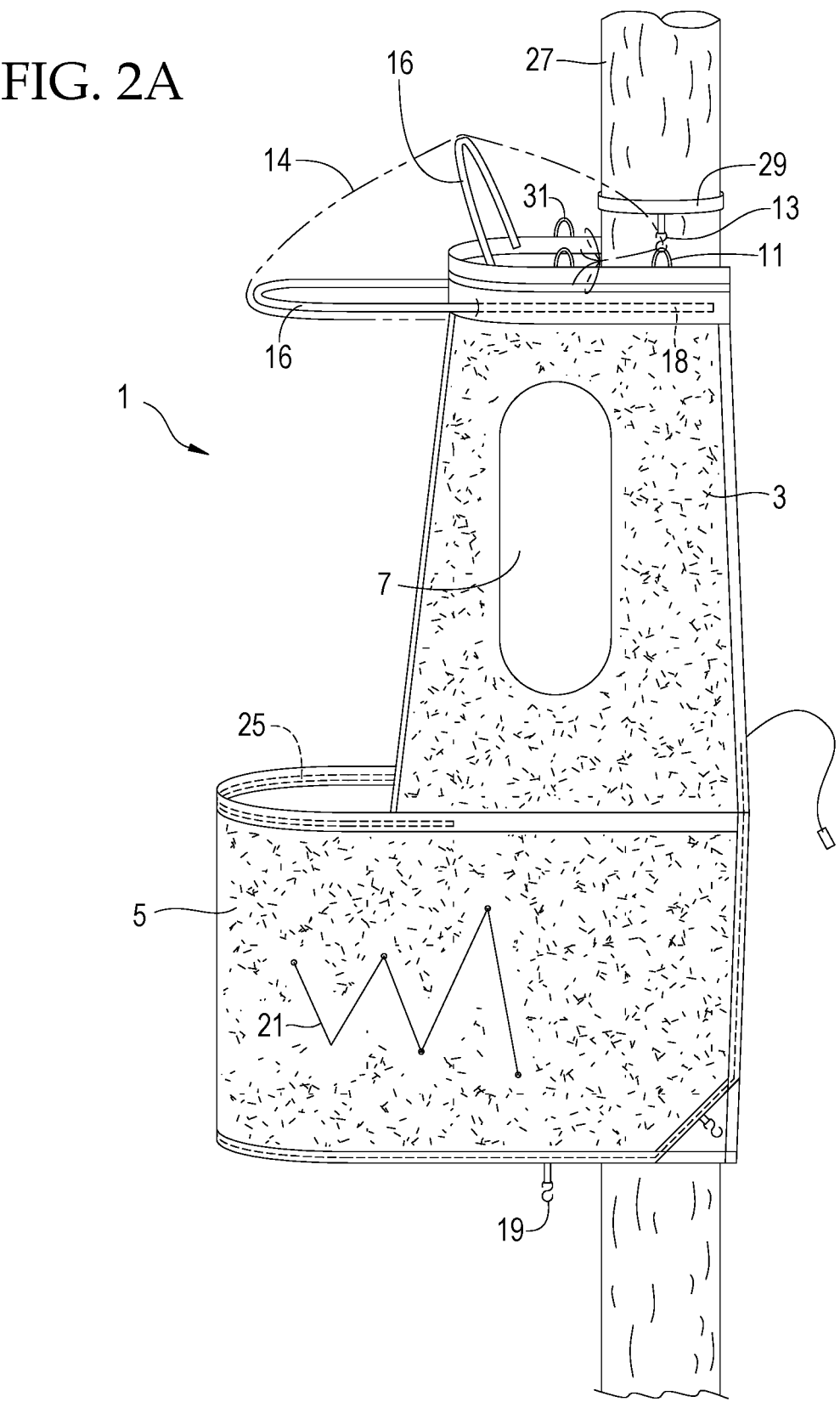
FIG. 2a is a side view of the tree stand blind mounted on a tree stand.

FIG. 1 depicts a tree stand blind 1 that is spread out on a flat surface. The blind 1 is comprised of two sides 3 connected by a lower center portion 5. The blind 1 may be made of flexible material, including a suitable fabric which may include a camouflage pattern to hide the user. For clarity, the figures are depicted in black and white. The blind 1 does not have a roof and does not have a complete front wall. Each side 3 of the blind incorporates a window 7. The windows 7 include a moveable shade mechanism that allows them to be fully or partially opened or closed as needed by the user. The top 9 of each of the sides 3 incorporates a rigid support section that may be formed by a sleeved fiberglass rod or other suitable material.

One or more support loops 11 are attached to the tops 9 of each side 3. The support loops 11 may be hung on hooks 13 (not depicted in FIG. 1) to suspend the blind 1 from a tree. The hooks 13 may be affixed to a tree strap (not shown) that is attached to the tree. A tie-down strap 15 is affixed to the outer end of each of the tops 9 of the sides 3. The tie-down strap may be constructed of paracord or other suitable material. Additional straps and/or buckles 17 or other appropriate attachment mechanisms may be attached to the sides 3 of the blind 1. One or more hooks 19 are attached to the bottom edge of the blind. These hooks 19 are adapted to engage the bottom platform of a tree stand when the blind 1 is in use. While hooks 19 are used in this embodiment, other appropriate fasteners including but not limited to wire twist ties may be used to attach the bottom of the blind 1 to a tree stand.

The sides 3 of the blind 1 incorporate one more drawstrings 21. In this embodiment, the drawstrings 21 are comprised of one or more cords threaded through one or more sleeves in the fabric of the blind 1. Spring-loaded cord locks or other appropriate drawstring tighteners are threaded onto the cord where it exits the sleeve to allow a user to tighten the drawstring and tighten the fabric of the blind 1. This makes the blind 1 fabric tight and prevents it from flapping in the wind. In this embodiment, the drawstrings 21 are incorporated into the blind 1 in a zig-zag configuration. The zig-zag configuration allows the tightened drawstring 21 to pull fabric from multiple directions and take up a large amount of slack in the blind's 1 fabric. The drawstrings 21 may also be configured in a spiral pattern or other suitable configurations. An additional drawstring 23 may be incorporated into the bottom edge of the blind 1 and may run up into the sides 3 of the blind 1 to tighten the blind around the platform of a tree stand. One or more of the hooks 19 may be mounted to the drawstring 23 for greater flexibility in mounting the blind 1.

Additionally, other embodiments of the blind may incorporate additional drawstrings not shown in FIG. 1. Further, the drawstrings 21, 23 may be composed of other materials and other configurations as needed to allow a user to tighten the fabric of the blind.

A rigid horizontal support 25 is incorporated into the fabric at the upper edge of the lower portion 5 of the blind 1. The support 25 extends across the top of the lower portion 5 and through the sides 3 and is terminated at the outer edges of the sides 3. The rigid support 25 may be comprised of separate hollow sections connected by an elastic cord like a tent pole, but other appropriate materials and configurations may be used. When the sections of the support 25 are assembled, the support 25 provides shape to the blind and functions as a frame. The support 25 is placed at the level of the user's knees. Additionally, the horizontal support 25 keeps the fabric off of the user and gives the user room to move freely within the blind 1. One or more front adjustment straps (not shown) may be affixed to the horizontal support 25. A user may tighten the adjustment straps to raise the horizontal support 25 or loosen the adjustment straps to lower the level of the horizontal support 25.

FIG. 2a is a side view of the tree stand blind 1 mounted on a tree stand (not shown because it is surrounded by blind 1) that is hung on a tree 27. A tree strap 29 is affixed to the tree 27 above the blind 1. The tree strap 29 may be a strap with an attachment mechanism (such as a buckle) that incorporates loops or hooks 13 for hanging the blind 1. The tree strap 29 may be made of nylon webbing, rope, or other suitable materials. The loops or hooks 13 may be made of plastic, metal, or other suitable material. The blind 1 may incorporate additional mounting loops 31 that allow the sides 3 of the blind 1 to be temporarily hung up during the mounting process. When the tree strap 29 is attached to the tree 27, the blind's 1 support loops 11 are hooked over the tree strap 29 hooks 13. Next, the hooks 19 at the bottom of the blind 1 engage the bottom platform of the tree stand (not shown) and the sections of the rigid support 25 are assembled. Then, the user pulls down on the tie-down straps 15, wraps the tie-down straps 15 around the tree 27, and fastens the tie-down straps 15 to one another. Pulling down and fastening the tie-down straps 15 makes the support loops 11 pivot in the hooks 13, thereby raising the front of the blind 1 and tightening the fabric of the blind 1. This upward pulling motion causes the bottom hooks 19 to tightly engage the tree stand platform and anchors the blind 1 in place. Alternatively, other tightening means may be used to secure the tie-down straps 15. In one embodiment, the other tightening means may include a rope tightener (not shown). One example of a suitable rope tightener is a Nite Ize™ FIG. 9® roper tightener.

When the blind 1 is anchored in place, the rigid support 25 holds the fabric of the bottom portion 5 of the blind 1 away from a user's knees. If needed, a user may then tighten the drawstrings 21 to make the blind 1 more rigid and to prevent it from flapping in the wind.

When assembled in this manner, the blind 1 has no roof and has no upper front wall. This allows a user to stand up and shoot a firearm or bow in any direction, including directly under the blind 1 or directly above the blind 1. The bottom platform of a tree stand and the bottom portion 5 of the blind 1 function as a "floor" that helps hide the user from game animals below the blind. The sides 3 of the blind 1 break up the user's silhouette and help hide the user and the tree stand from game animals that are not directly under the blind 1. The user may wear camouflage clothing that matches the camouflage pattern of the blind 1—by doing so, the user effectively "becomes the blind" and the user's clothing functions as the upper front wall of the blind 1.

Optionally, the blind 1 may be fitted with a removeable canopy 14. The canopy 14 is composed of a flexible material and is adapted to receive one or more support rods 16. In one embodiment, the canopy 14 may be made of a flexible, weather resistant material that incorporates the same camouflage pattern as the blind 1. The support rods 16 may be inserted into sleeves 18 formed in the blind 1. The canopy 14 may also include one or more ties or other appropriate means to fasten the canopy 14 to the blind 1.

Figure 2B:
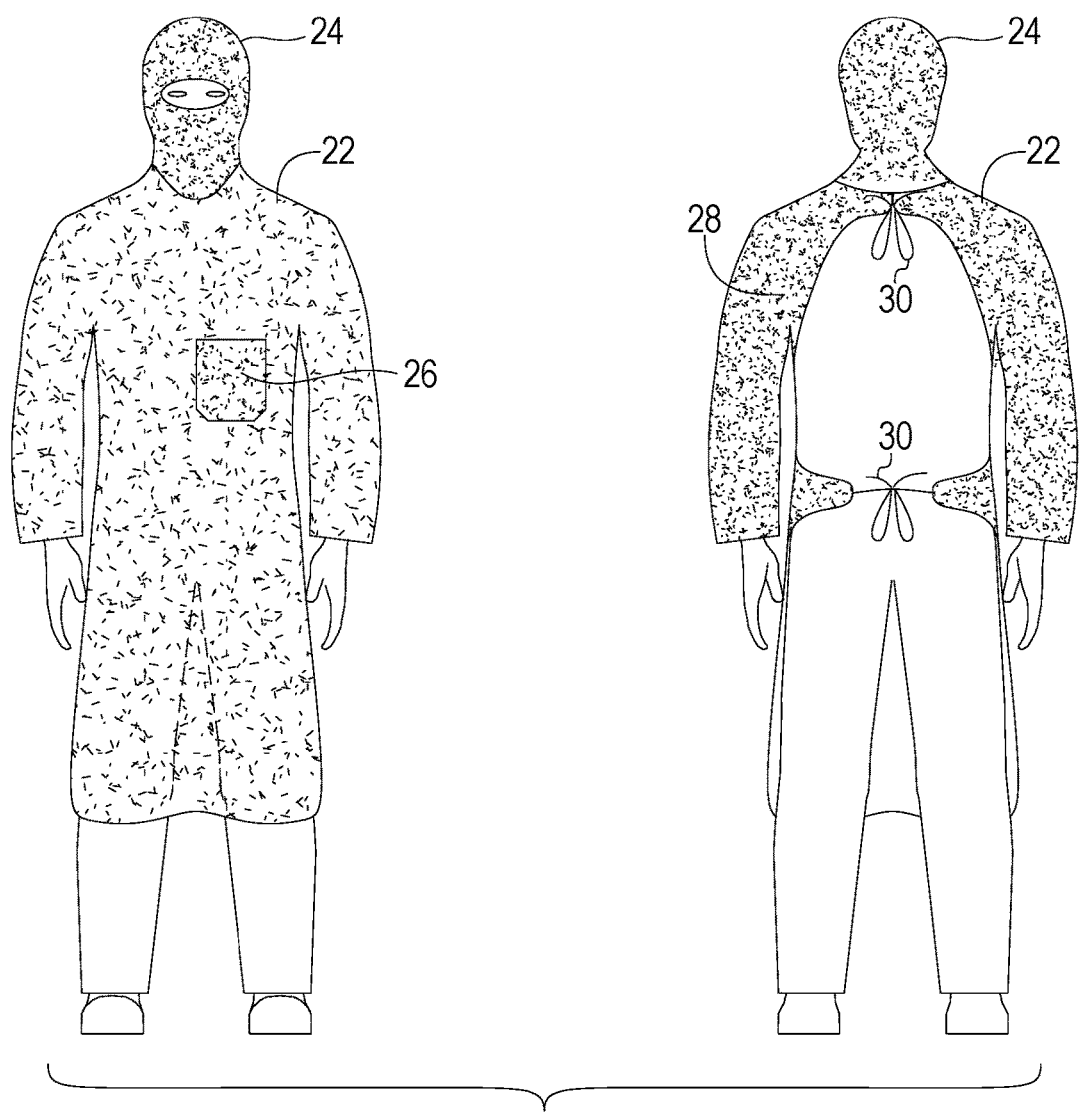
FIG. 2b depicts a bib and facemask to be used in conjunction with the blind.

To enhance this effect, the blind 1 may be used in conjunction with a bib 22 and facemask 24 made of camouflage material that incorporates the same camouflage pattern as the blind 1. The bib 22 and facemask 24 are depicted in FIG. 2b. The front of the bib 22 may incorporate one or more pockets 26 to hold game calls, snacks, etc. The pockets 26 may also function as a holder for a bow (not shown). The back 28 of the bib 22 may be open and may incorporate strings 30 or other appropriate fastening means to secure the bib 22 to the user.

Figure 3:
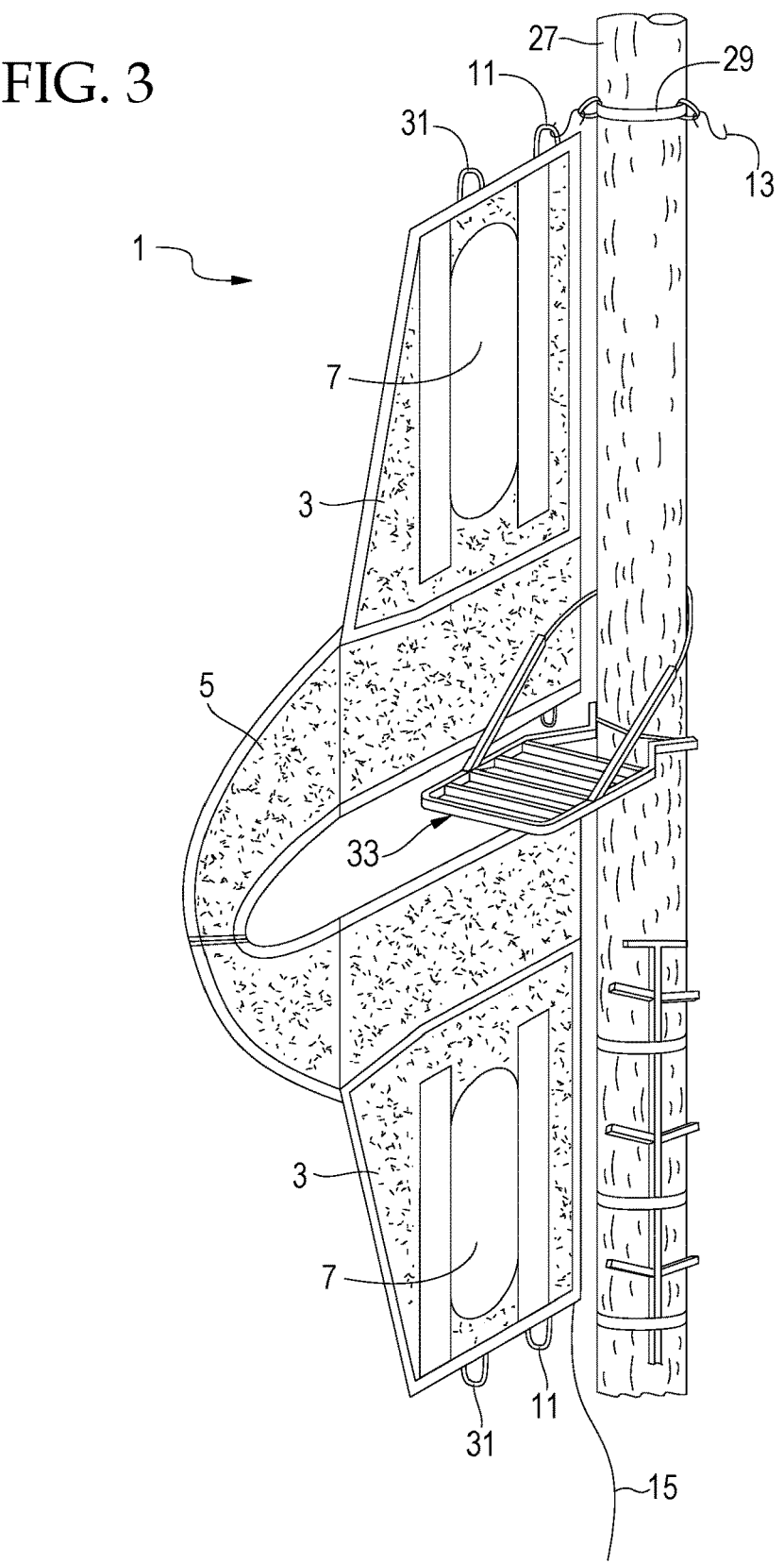
FIG. 3 is a perspective view of a moveable brace.

FIG. 3 is a side view of the blind 1 mounted on a tree stand 33 with one side 3 unhooked from the tree strap 29 hooks 13 to allow a user to enter the tree stand 33 and blind 1. Here, a user may have left the blind 1 assembled on the tree stand 33 and not disassembled the blind 1 in between hunts. Rather than re-assembling the blind 1 for the next hunt, it's easy for the user to lower one side 3, climb inside and sit on the stand 33, then raise the side 3 to complete assembly of the blind.

Figure 4:
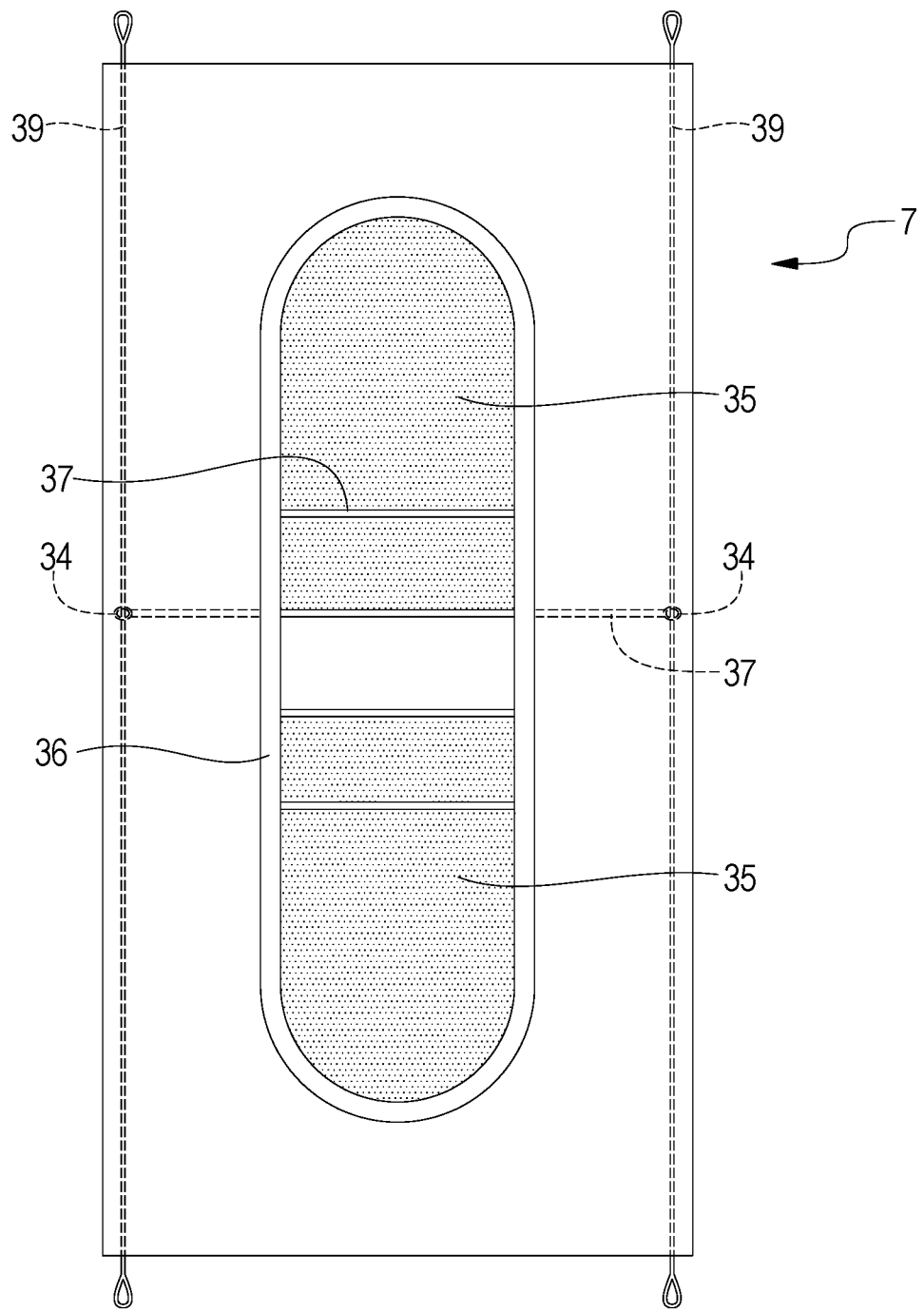
FIG. 4 is an enlarged view of one of the blind windows.

FIG. 4 is an enlarged view of one of the blind 1 windows 7. Each window 7 may be made up of an assembly comprised of one or more shades 35. One or more rigid poles 37 are incorporated into the shades 35. The ends 34 of the poles 37 are moveably attached to a guide wire 39 incorporated into the blind 1 fabric. The poles 37 allow the shades 35 to move up and down, and friction holds the shades 35 in place when they are positioned by the user. Elastic bungee cord 36, rubber tubing, or other suitable material may be affixed around the perimeter of the window 7 to apply extra friction to hold the shades 35 in place. The shades 35 operate independently of each other and may be placed so the window 7 is completely open, partially open, completely closed, or any other desired position. The guide wire 39 may be made of monofilament fishing line or any suitable material. The rigid poles 37 may be made of fiberglass, plastic, or any other suitable material.

Figure 5:
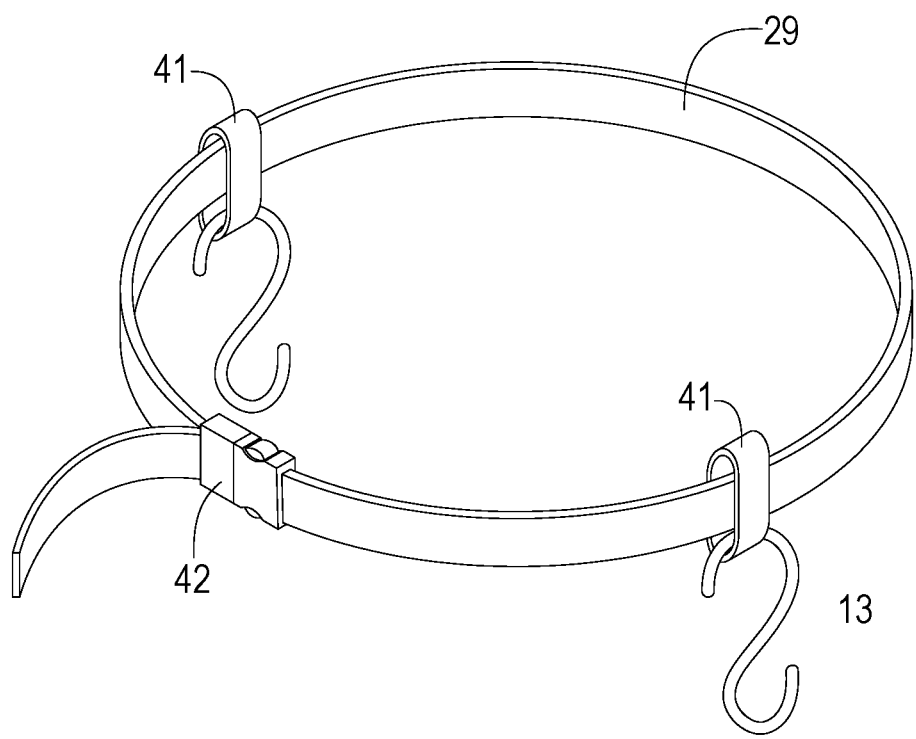
FIG. 5 is an enlarged view of the tree strap and hooks.

FIG. 5 is an enlarged view of the tree strap 29 and hooks 13. The hooks 13 may incorporate one or more loops 41 on one end to allow them to moveably slide around the tree strap 29 to adjust to different sized trees. Although hooks 13 are depicted in this embodiment, loops, clips or other appropriate fastening means may be used. The tree strap 29 may also be incorporated into a carrying case (not shown). The tree strap 29 may incorporate a buckle 42 or other appropriate fastening means to secure the tree strap 29 to a tree 27.

FIG. 6a is an overhead view depicting an assembled rigid horizontal support 25 without the blind 1 depicted around it. The FIG. 6a) demonstrates how the assembled rigid support 25 may be configured of separate sections 44 connected with angled joints 46 adapted to keep the support 25 suspended away from the user's knees. FIG. 6b depicts the assembled rigid support 25 in relation to a tree 27 when the blind 1 (not shown) is assembled. A strap 45 may be attached to the rigid support 25 to help hold the support 25 and the blind 1 in close contact with a tree 27. The strap 45 may be looped around the rigid support 25. The strap 45 may incorporate buckles or other suitable fastening means. The strap 45 may constructed with elastic sections and tightened with a rope tighter. The strap 45 may be fitted into a sleeve (not shown) in the blind 1 fabric. The rigid horizontal support 25 may be comprised of separate hollow sections 44 connected by an elastic cord like a tent pole, but other appropriate materials and configurations may be used. When the sections 44 of the support 25 are assembled, the support 25 provides shape to the blind and functions as a frame. The support 25 is placed at the level of the user's knees.

Figure 7:
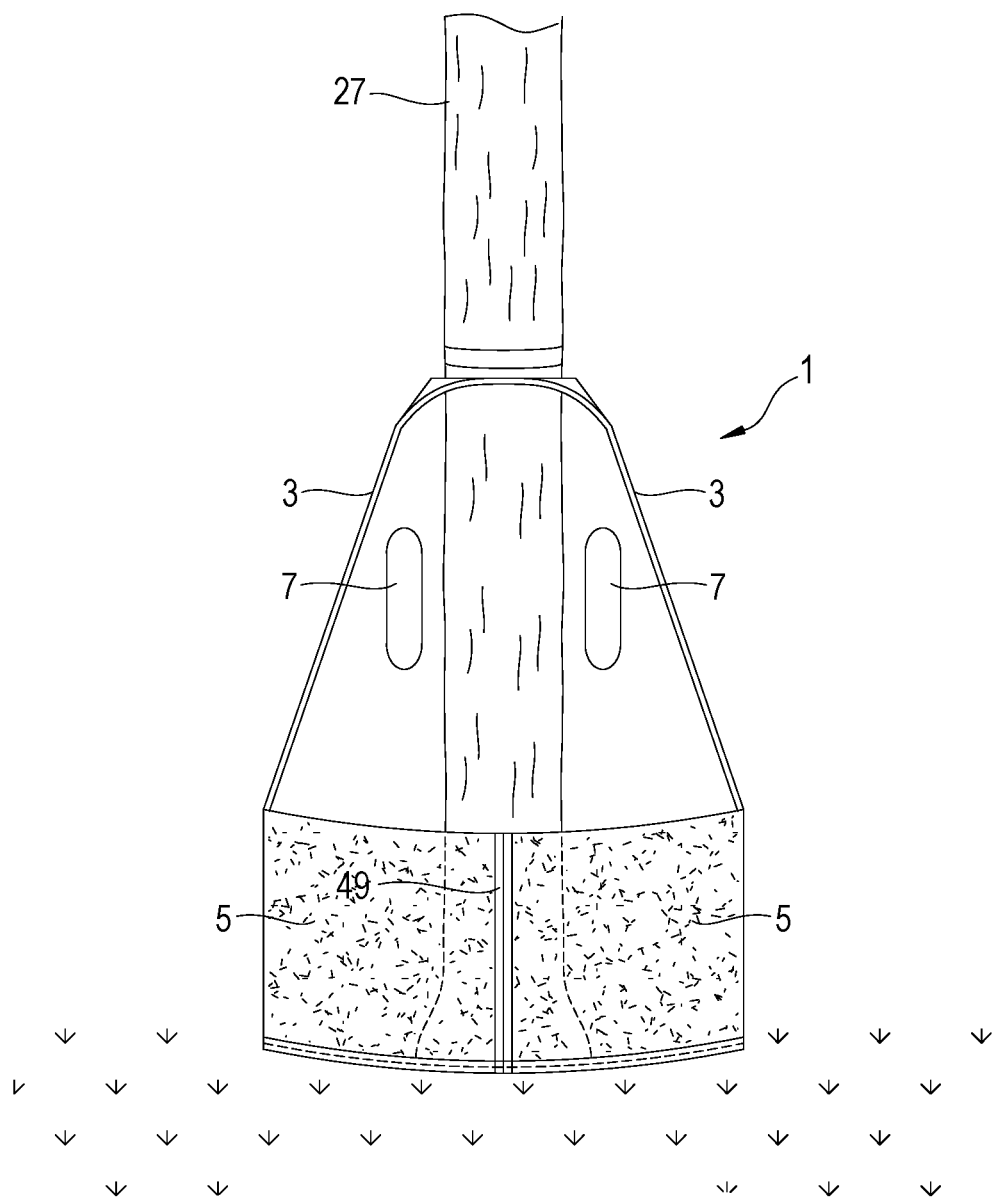
FIG. 7 is a front view of the assembled blind.
Figure 8:
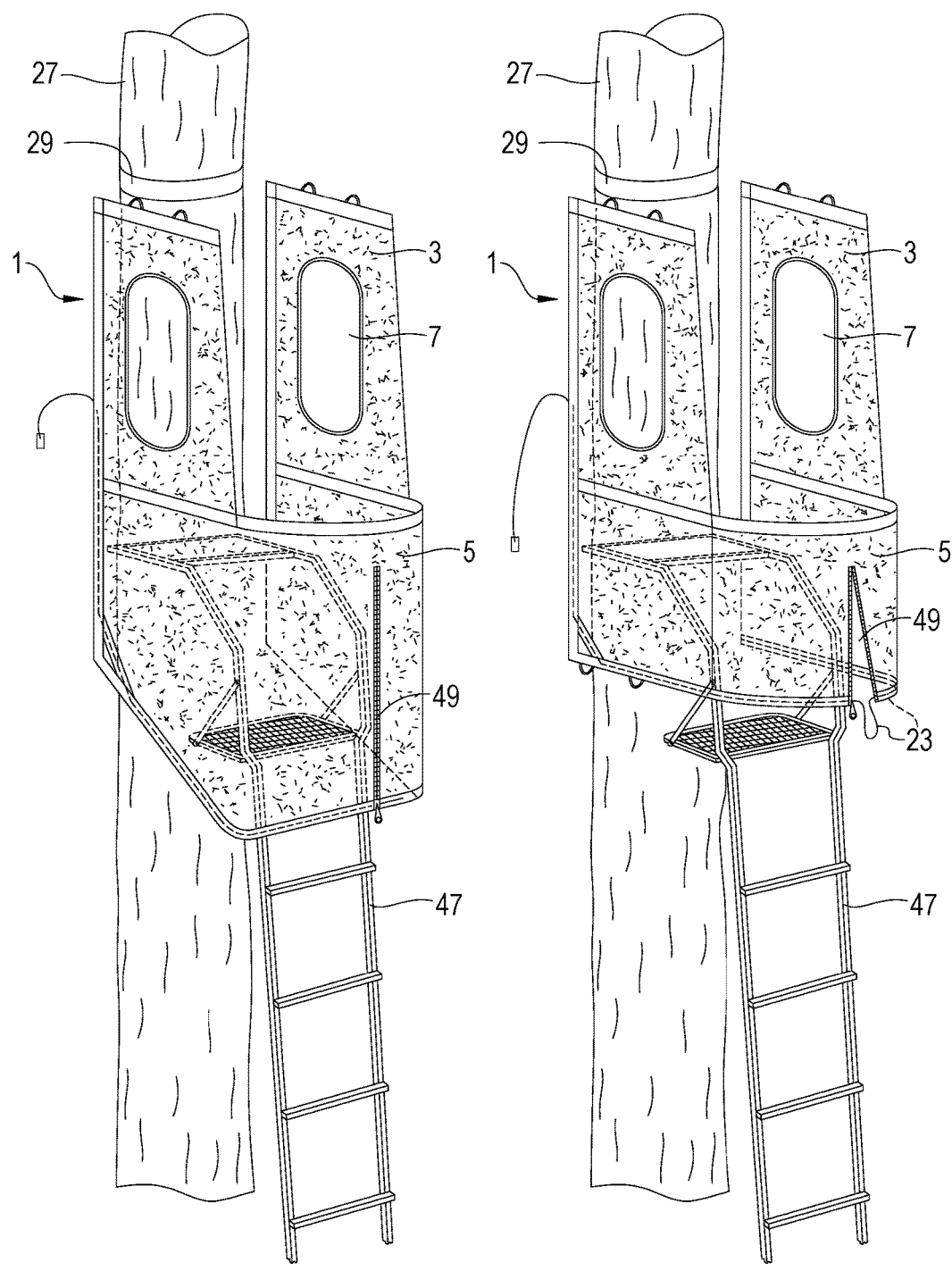
FIG. 8 depicts an embodiment of the tree stand blind adapted for use with a ladder type tree stand.

FIG. 7 is a front view of the tree stand blind 1 mounted on a tree 27. The tree stand is not visible in this view. FIG. 8 depicts an embodiment of the tree stand blind 1 adapted for use with a ladder type tree stand 47. To facilitate entry into the blind 1, the center portion 5 may incorporate a closeable opening 49 that can be opened when a user climbs into the stand 47. The opening 49 may be secured with hook and loop fasteners, a zipper, snaps, or other suitable closure method. Alternatively, the drawstring 23 along the bottom of the blind may include cord stops at the front of the blind to allow the user to loosen the drawstring 23, pull the bottom of the blind 1 up and climb into the stand 47, and then tighten the drawstring 23 to re-secure the blind 1.

Figure 9:
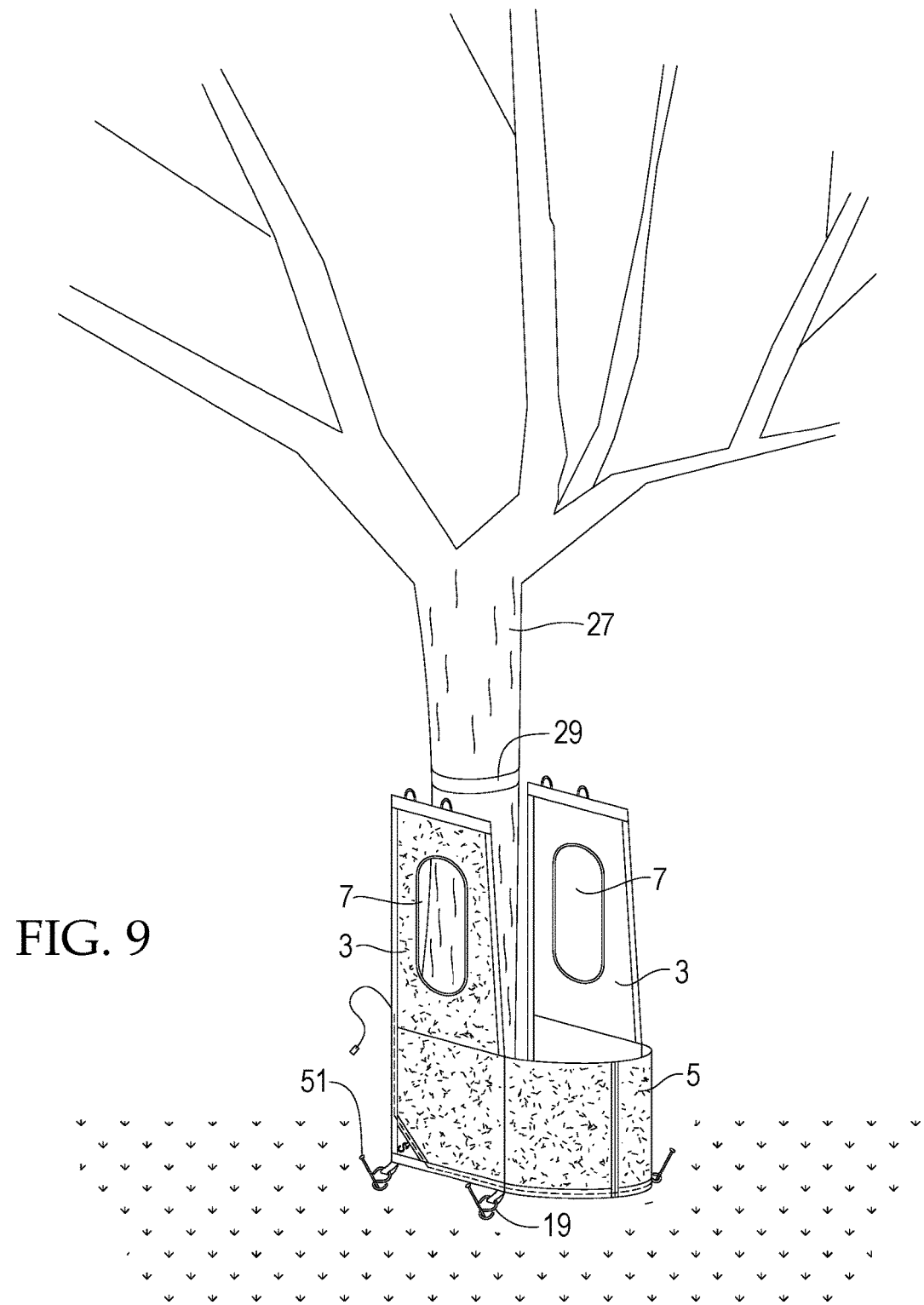
FIG. 9 is a side view of the tree stand blind being used as a ground blind.

FIG. 9 depicts the tree stand blind 1 being used as a ground blind. To accomplish this, the user simply mounts the tree strap 29 close enough to the ground to allow the bottom of the blind 1 to hang close to the ground. Stakes 51, spikes, or other suitable staking means may be driven through the hooks 19 on the bottom edge of the blind 1 to hold the blind 1 in place. In one embodiment, stakes 51 may be attached to a length of cord and an adjustable clipping mechanism to allow the blind 1 to be secured on uneven ground.

Figure 10:
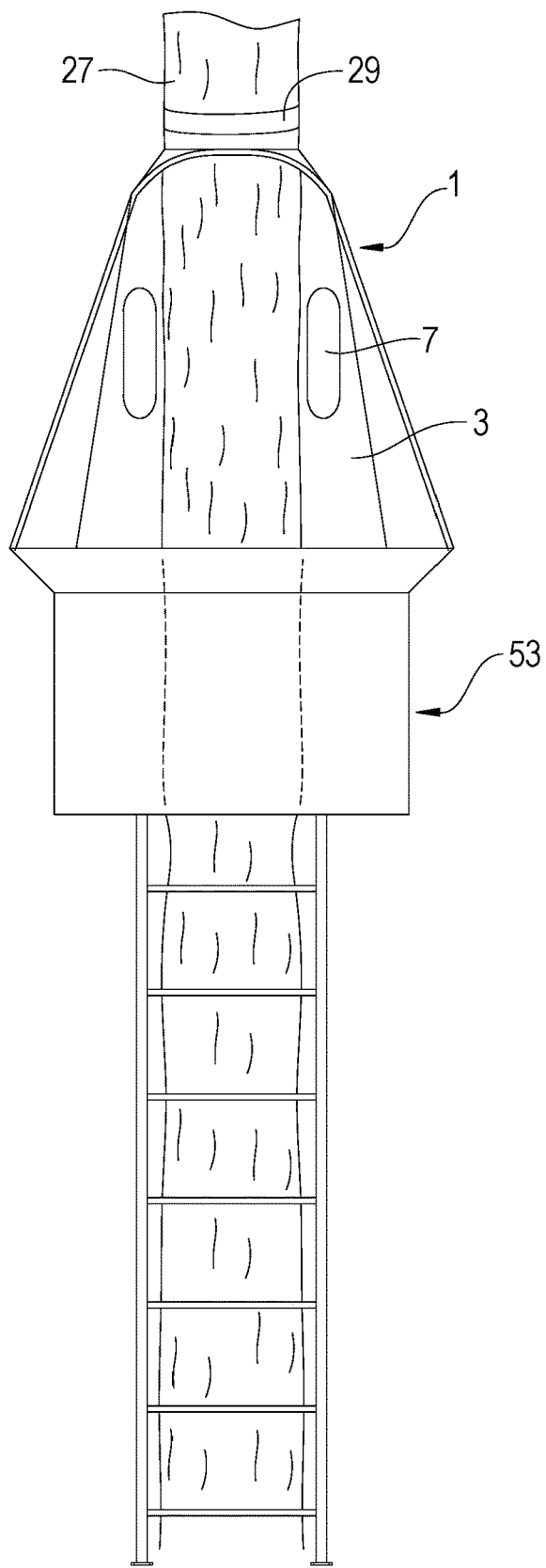
FIG. 10 depicts an embodiment of the tree stand blind adapted to fit a ladder stand with a partially enclosed platform.

FIG. 10 depicts an embodiment of the tree stand blind 1 adapted to fit a ladder stand with a partially enclosed platform 53. Here, the two sides 3 of the blind 1 are attached directly to the enclosed platform 53, and the enclosed platform 53 functions as the lower center portion 5 of the blind 1. The sides 3 may be attached to the enclosed platform 53 with zip ties, rope, wire twist ties, or other suitable fastening means.

FIG. 11 depicts a blind carrying case 55. The carrying case 55 has a large opening 57 that facilitates removing the blind 1 from the case 55 or placing the blind 1 into the case 55. A drawstring 59 or other appropriate closure mechanism may be incorporated into the carrying case 55. The carrying case 55 may include a bottle holder 61 adapted to receive a bottle 65 or other container. A tree strap 29 may be moveably attached to the carrying case 55. In one embodiment, the tree strap 29 may be affixed to the carrying case 55 by one or more loops.

When the blind 1 is assembled, the carrying case 55 hangs from the tree strap 29 and can then serve as storage for the blind 1 user. Because the tree strap 29 is moveably attached to the carrying case 55, the carrying case 55 may move independently of the tree strap 29, giving a user the ability to adjust the position of the carrying case 55 when the blind is in use. The carrying case 55 may also incorporate straps (not shown) to allow a user to easily carry the case like a backpack or satchel. The carrying case 55 may also incorporate loops 63 that are used to steady the blind 1 by providing a location for the blind's 1 tie down straps 15 to be secured.

The foregoing description of preferred embodiments for the tree stand blind 1 is presented for the purposes of illustration and description. They are not intended to be exhaustive or to limit the invention to the precise form disclosed. Obvious modifications or variations are possible in light of the above teachings. The embodiments are chosen and described in an effort to provide the best illustration of the principles of the invention and its practical applications, and to thereby enable one of ordinary skill in the art to utilize the invention in various embodiments and with various modifications as are suited to the particular use contemplated.

What is claimed is:

1. A hunting blind comprising:
a first side and a second side, wherein the first side has a top and a bottom and the second side has a top and a bottom;
a lower portion with a top, and a bottom;
one or more windows incorporated into each side;
a rigid support section incorporated into the top of each side;
one or more support loops affixed to each support section;
one or more support loops affixed to the bottom of the lower portion; and
one or more tree straps;
a removable canopy attached to the rigid support section;
wherein each side is connected to opposite sides of the top of the lower portion so that an opening is formed between the first and second sides over a center of the lower portion;
wherein the bottom of the first side is connected to a left side of the top of the lower portion to form a continuous left boundary;
wherein the bottom of the second side is connected to a right side of the top of the lower portion to form a continuous right boundary;
wherein the first and second sides and the lower portion of the blind are made of a flexible material;
wherein the blind is assembled to form an opening at a rear of the assembled blind.

2. The blind of claim 1, where the lower has an upper edge that incorporates a rigid bar.

3. The blind of claim 2, where the rigid bar is adapted to be disassembled for transport of the blind.

4. The blind of claim 3, where the rigid bar is comprised of sections connected to one another to form a rigid structure.

5. The blind of claim 1, where the windows comprise a window frame and a panel that may be raised or lowered.

6. The blind of claim 5, further comprising one or more sections incorporated into the window frame, wherein the sections are made of friction material and where the friction material exerts friction upon the panel and holds the panel in place after the panel is raised or lowered by a user.

7. The blind of claim 1, wherein the removeable canopy is made of a flexible material with one or more canopy supports and is secured to the blind.

8. The blind of claim 7, wherein the rigid support sections incorporated into the tops of the sides further comprise an opening for receiving the one or more canopy supports.

9. The blind of claim 1, wherein the first tree strap is attached to the tree.

10. The blind of claim 9, further comprising one or more hooks being used to connect the first tree strap to the support loops on the rigid support section.

11. The blind of claim 10, where the first tree strap is attached to a blind carrying case.

12. The blind of claim 10, further comprising one or more hooks engaging the support loops located on the lower portion to hold the blind in place.

13. The blind of claim 10, further comprising one or more hooks attaching the bottom of the lower portion to a tree stand.

14. The blind of claim 1, further comprising of one or more drawstrings.

15. The blind of claim 14, wherein the drawstrings are incorporated into the blind in a spiral pattern.

16. The blind of claim 14, wherein the drawstrings are incorporated into the blind in a zig-zag pattern.

17. The blind of claim 1, wherein flexible material is comprised of camouflage fabric.

18. The blind of claim 1, further comprising one or more storage pockets incorporated into the blind.

19. The blind of claim 1, further comprising one or more tie-down straps affixed to the rigid support section of each side of the blind.

20. The blind of claim 1, wherein the lower portion contains an opening in the center of the lower portion for entry.

21. The blind of claim 20, wherein the opening in the center of the lower portion for entry contains a securing mechanism.

22. The blind of claim 21, wherein the securing mechanism is a hook and loop apparatus.

23. The blind of claim 21, wherein the securing mechanism is a zipper.

24. The blind of claim 21, wherein the securing mechanism is a snap.

* * * * *